Patented July 5, 1949

2,474,881

UNITED STATES PATENT OFFICE 2,474,881

PRODUCTION OF VISCOUS OIL BY COPOLYMERIZATION OF AROMATIC OLEFIN WITH MONOOLEFIN

David W. Young, Roselle, and William H. Smyers, Westfield, N. J., assignors to Standard Oil Development Company, a corporation of Delaware No Drawing. Application December 12, 1945, Serial No. 634,617

4 Claims. (Cl. 260—668)

The present invention relates to an improved hydrocarbon polymer oil which may be readily prepared synthetically by copolymerization of certain hydrocarbon constituents. The process and the nature of the improved product and some of its uses will be fully understood from the following description.

It has been found that valuable oily hydrocarbons may be prepared by the copolymerization of olefins, especially isoolefins on the one hand with vinyl aromatic hydrocarbons on the other, at moderate temperatures of the range of say 0 to 200° C., or somewhat higher preferably 10 to 180° C. These oils are colorless and may be made of the full range of viscosity of natural mineral lubricating oils and even more viscous products may be prepared than can be obtained from natural sources. These oils are useful not only as lubricants and lubricating oil blending agents but also as plasticizers in various hydrocarbon soluble resin compositions and as tackifiers for natural and especially for synthetic rubbers.

The present polymer oils are prepared from various olefins such as ethylene or propylene, but preferably isoolefins such as isobutylene or isoamylene, say in proportion of 50 to 99% by weight, preferably 60–90%, with 50 to 1%, preferably 40 to 10%, of a vinyl aromatic compound such as styrene, vinyl naphthalene and the various alkylated products such as methyl styrene, a methyl, p-methyl styrene and other alkyl vinyl aromatics, or indene. Mixtures of two or more of either reactants or both, may be used. The reaction, which is believed to involve both polymerization and condensation, is conducted in liquid phase at temperatures above 0° C. The ingredients are liquefied either by suitable adjustment of temperature or by pressure and, on adding catalyst, polymerization rapidly ensues and a considerable amount of heat is evolved which may, of course, be removed. Cooling is not a difficult problem as the temperature may be allowed to range widely. The vessel may be cooled by a suitable jacket, coils or the like or it may be cooled by evaporation of some of the ingredients which can be condensed and returned as reflux. It is not necessary to strongly refrigerate but it is desirable to agitate thoroughly.

While it is stated that it is not necessary to control the temperature narrowly so long as it is above 0° C., it will be understood that the nature of the product can be varied by the control of the reaction temperature in the range specified, but always above 0° C.

An inert solvent or diluent may be used if desired, and such may be a volatile one such as a refined naphtha or kerosene, hexane, tetrachlorethane or carbon tetrachloride, or else a nonvolatile one such as a mineral lubricating oil, preferably one in which the synthetic oil may be used.

Catalytic agents are required for the reaction and these are of the Friedel-Crafts type, especially gaseous boron fluoride although aluminum chloride, aluminum bromide, titanium tetrachloride or other catalysts of the class or complexes of the same type are useful for the purpose.

Reaction is relatively rapid and is largely concluded in 10 minutes to two hours but it will continue thereafter perhaps as a secondary reaction for several hours unless the catalyst is removed or killed by alcohol or water. It is desirable to remove all traces of the catalyst by washing with water and to distill off any unreacted raw materials and, if desired, the lower boiling constituents, with steam in order to obtain a finished product with a reasonably high flash point for commercial use.

The synthetic aliphatic-aromatic hydrocarbon oil obtained by the present process is colorless or water-white and the viscosity may be controlled over whatever range is desired. The physical properties may vary somewhat, depending on the ingredients, and their exact proportions. The specific gravity is below that of the water, ordinarily from .90 to 0.95 or thereabout and the flash point is from 120° C. to 280° C., depending on the viscosity. While the flash point is lower than that of some natural hydrocarbon oils of the same viscosity, it is above that of most of the polymer oils, for example those obtained by the simple polymerization of isoolefins. The viscosity at 210° F. is of the full range obtained in lubricating oils, for example, from 30 to 2000 seconds Saybolt at 210° F., and as stated before depends on the degree of polymerization and the specific polymerization mixture.

As indicated above, products of any desired viscosity may be readily prepared by controlling several factors which may be interadjusted during the reaction. In general other conditions being the same, the following effects are noted:

1. An increase in the per cent of styrene or other vinyl aromatic hydrocarbon decreases the viscosity of the product produced.
2. An increase in polymerization temperature produces a less viscous product.
3. The more powerful the catalyst the higher will be the viscosity. It may be stated that boron fluoride is denoted as a powerful catalyst and $TiCl_4$ and $TiBr_4$ may be considered as less powerful.

These various factors may be adjusted among themselves to give the viscosity desired, it being observed that the proportion of isoolefin and vinyl aromatic should be within the ranges given and the temperature of polymerization should always be above 0° C.

The oils made by the present method are useful both as lubricants, and in the case of the oils with a viscosity at 210° F. of about 1000 to 2000 S. S. U., as thickening agents for natural petroleum oils. They are miscible with hydrocarbons in all proportions and with waxes which they are capable of softening or plasticizing. These oils are also used as softeners or plasticizers in various hydrocarbon-soluble resin compositions, such as polyethylene, polystyrene, polybutene, styrene-isobutylene resins made at low temperatures, i. e., below 0° C., e. g., —10° C. or —103° C., etc., being more suitable than simple polymers of isobutylene because of their greater solvent power. One important use of the least volatile fractions of present product is for imparting "tack" to various synthetic rubbers which are notably deficient in this property so familiar in natural rubber. These oils give a very desirable tack to the various emulsion copolymers such as copolymers of styrene with butadiene or with other diolefins and also with the copolymers of acrylonitrile with similar diolefins, and also with low temperature polymers such as those prepared from mixtures of isoolefins and diolefins, for example the synthetic rubber made of isobutylene with 1-3% of isoprene at —103° C. with a catalyst solution of $AlCl_3$ in methyl chloride. When used for this tackifying purpose the oils are employed in proportions of from 1 to 40% based on the rubber stock and are simply added at the mixing mill with the other ingredients. For this purpose it is preferred to employ oils having a viscosity above 40 seconds Saybolt at 210° F.

The synthetic oils of this invention may also be used as inert high-boiling solvent media for carrying out various chemical reactions, such as esterifications, etc.

More volatile fractions of aliphatic-aromatic hydrocarbon oil made according to this invention, especially at the higher temperatures and, with high aromatic content, and having a low viscosity, e. g., about 30–70 seconds Saybolt at 100° F. may be used as a solvent oil in motor fuels, e. g., by adding 0.1–2.0%, preferably 0.5–1.0% to a gasoline basestock.

The following examples may be considered illustrative of the methods for producing the oil and some of their uses:

Example 1

800 grams of isobutylene were mixed with 200 grams of styrene and maintained in a vessel fitted with a reflux condenser, cooled with solid $CO_2$. The original temperature of the mixture was 13° C. On adding boron fluoride for about two minutes at the rate of 10 cubic feet per hour, the temperature rose to about 180° C. over a period of about 15 minutes, causing the reactants to boil but they were returned by the reflux condenser with little or no loss. The reaction was very vigorous, in the range of 80 to 90° C. The materials in the flask thickened considerably during the reaction and after maintaining it for 15 minutes at 100° C., four liters of cold water were added to cool and remove the catalyst. The oil was decanted from the water and heated to remove traces of water. The oil recovered amounted to 897 grams. On removing final traces of low boiling hydrocarbons the final yield was 89.7% having the following specifications:

| | |
|---|---|
| Specific gravity | 0.930 @ 20° C. |
| Saybolt viscosity at 210° F. | 1760 sec. |
| Flash point | 305° F. |
| Conradson carbon | 0.02% |
| Pour point | +30° F. |

Example 2

A polymer oil was made in much the same manner as shown in Example 1, with the exception that 30% styrene was employed and the only cooling was from the evaporation of part of the raw materials, so that the product had a viscosity of only 120 seconds Saybolt at 210° F. The following data show the use of this material as a plasticizer or tackifier in a styrene-butadiene emulsion rubber made with 25% styrene according to the following base formula:

| | Parts |
|---|---|
| Synthetic rubber | 100 |
| Zinc oxide | 5 |
| Stearic acid | 1 |
| Cabot's carbon black | 9 |
| Monex (tetra methyl thiuram mono sulfide) | 0.4 |
| Sulfur | 1.5 |
| Plasticizer | Various |

| Formula | Parts of Plasticizer | Parts of Plasticizer | Parts of Plasticizer |
|---|---|---|---|
| Isobutylene-styrene oil | 0 | 5 | 10. |
| Time to incorporate on mill | | 3 min. | 5 min. |
| Williams Plast. Rec. 5/70° C. | 175–40 | 151–24 | 150–28. |
| Mooney Vis. @ 212° F. (1½ min.) | 58 | 56 | 48. |
| Extrusion Rate: | | | |
| Grams/min. | 97 | 100 | 109. |
| Inches/min. | 45 | 48 | 51. |
| Appearance | Smooth | Smooth | Smooth. |
| Tack | None | Fair | Fair. |
| Cure 60′ at 287° F.: | | | |
| Lbs./sq. inch, Tensile | 2,755 | | |
| Modulus @ 300% | 1,100 | | |
| Elongation, per cent | | | |

Example 3

Another sample of the oil was made much as in Example 1 except that this time 25% of styrene was employed. It was then used as a tackifier for synthetic rubber made from butadiene containing 25% styrene. The following was the base formula:

|  | Parts |
|---|---|
| Synthetic rubber | 100 |
| Zinc oxide | 5 |
| Cabot's carbon black | 45 |
| Sulfur | 1.5 |
| Monex (tetra methyl thiuram mono sulfide) | 0.4 |
| Plasticizer | 10 |

| | | |
|---|---|---|
| Williams Plast. Red. 5 Kg. @ 70° C. | 123–16 | 109–15. |
| Mooney @ 212° F | 64 | 50 |
| Tack | Very slight | Fair. |
| Tensile—Elongation—Modulus @ 300%: | | |
| 15' Cure @ 287° F | 190—700—90 | 130—910—60. |
| 30' | 2510—590—890 | 2090—680—600. |
| 45' | 2900—570—1160 | 2430—600—840. |
| 60' | 3000—540—1260 | 2530—600—860. |
| Remarks | No plasticizer added. | 10 parts plasticizer. |

Example 4

A styrene-isobutylene resin was made according to U. S. Patent 2,274,749, by polymerizing 60% styrene and 40% isobutylene at –100° C., using boron fluoride catalyst. It was found to be tough, hard and not readily processed at normal temperatures. It was mixed in proportion of 75 parts of the resin with 25 parts of a styrene-isobutene oil made in accordance with the present procedure. It gave a homogeneous mass which had a tensile strength of 909 pounds per square inch and broke at an elongation of 530%. It was much more readily processed than the original material, could be extruded readily and rolled into thin, self-supporting films. The mixture could be readily dissolved in toluene and when spread or painted on wood, paper or metal surfaces gave an excellent glassy film which was strongly adherent.

Example 5

Styrene (200 g.) and liquid isobutylene (800 g.) were mixed in a Pyrex beaker at 0° C. and then placed in a 4 l. Dewar flask. $BF_3$ gas catalyst was added for about 2 minutes at a slow rate. No internal or external refrigerant was used. No diluent was added. Immediately after the reaction had taken place the material was poured into a 4 l. beaker and the catalyst was not killed. After about two minutes an after reaction was noted, manifested by sudden extreme heating of the material. In cooling the oil was worked 4 times with an equal volume of water. Water was removed by decantation. The oil was heated to 140° C. for 1 hour, with constant stirring and passing of $CO_2$ over the surface. The yield of product was 58% by weight. Product was clear and colorless. Inspections on the sample are given:

S. S. U. viscosity at 210° F.=190
Flash point=300° F.

We claim:

1. A process for producing synthetic hydrocarbon oils which comprises copolymerizing a mixture of 70 to 80% by weight of isobutylene and 30 to 20% by weight of styrene by refluxing at a temperature of 10° to 180° C. in the presence of a boron fluoride catalyst.

2. A clear colorless synthetic hydrocarbon oil having a flash point between 120 and 280° C. and a viscosity of 30 to 2000 seconds Saybolt at 210° F., said oil being a copolymer of 60 to 90% by weight of a monoolefin having less than 5 carbon atoms and 40 to 10% by weight of a polymerizable monoolefinic aromatic hydrocarbon, and said oil having been made by treating said two reactants at 10° C. to 180° C. with a Friedel-Crafts catalyst.

3. Product according to claim 2 made by copolymerizing 70 to 80% by weight of isobutylene and 30 to 20% by weight of styrene in the presence of boron fluoride as catalyst, using a final reaction temperature at least as high as 80° C.

4. Process for producing clear colorless synthetic hydrocarbon oils having a viscosity of 30 to 2000 seconds Saybolt at 210 F. which consists in treating a mixture of 60 to 90% by weight of a monoolefin having less than five carbon atoms and 40 to 10% by weight of a polymerizable monoolefinic aromatic hydrocarbon with a Friedel-Crafts catalyst at 0 to 20° C., permitting the exothermic reaction to heat the reaction mixture to about 80° C. to 180° C, and then stopping the reaction by inactivating the catalyst.

DAVID W. YOUNG.
WILLIAM H. SMYERS.

REFERENCES CITED

The following references are of record in the file of this patent:

UNITED STATES PATENTS

| Number | Name | Date |
|---|---|---|
| 2,139,038 | Russel | Dec. 6, 1938 |
| 2,213,423 | Wiezevich | Sept. 3, 1940 |
| 2,379,656 | Ruthruff | July 3, 1945 |
| 2,386,507 | Quin | Oct. 9, 1945 |

FOREIGN PATENTS

| Number | Country | Date |
|---|---|---|
| 107,360 | Australia | May 5, 1993 |
| 467,932 | Great Britain | June 25, 1937 |
| 513,521 | Great Britain | Oct. 16, 1939 |